MAGNETIC AMPLIFIER SERVO CIRCUIT

Filed May 14, 1954 5 Sheets-Sheet 1

BILLY E. DAVIS,
INVENTOR.

HUEBNER, BEEHLER,
WORREL & HERZIG,
ATTORNEYS.

BY Warren T. Jessup

BILLY E. DAVIS,
INVENTOR.
HUEBNER, BEEHLER,
WORREL & HERZIG,
ATTORNEYS.
BY Warren T. Jessup Sept. 20, 1960 B. E. DAVIS 2,953,302

MAGNETIC AMPLIFIER SERVO CIRCUIT

Filed May 14, 1954 5 Sheets-Sheet 3

BILLY E. DAVIS,
INVENTOR.

HUEBNER, BEEHLER,
WORREL & HERZIG,
ATTORNEYS.

BY Warren T. Jessup

BILLY E. DAVIS,
INVENTOR.

HUEBNER, BEEHLER,
WORREL & HERZIG,
ATTORNEYS.

BY Warren T. Jessup

BILLY E. DAVIS,
INVENTOR.

HUEBNER, BEEHLER,
WORREL & HERZIG,
ATTORNEYS.
BY Warren T. Jessup

United States Patent Office 2,953,302

Patented Sept. 20, 1960

2,953,302

MAGNETIC AMPLIFIER SERVO CIRCUIT

Billy E. Davis, China Lake, Calif.
(7119 Langdon, Houston, Tex.)

Filed May 14, 1954, Ser. No. 429,852

10 Claims. (Cl. 235—178)

This invention relates to an electric circuit having two discrete modes of operation, which circuit is very sensitive to minor change in input signal to jump from one mode of operation to another; particularly to such a circuit when used as an electric servo circuit; and more particularly to such a circuit when used as a summation circuit, as in an analogue computer.

It is an object of this invention to provide an electric circuit which has two discrete modes of operation, and which adopts one mode or the other in response to a slight deviation in input signal from a zero value, either positive or negative.

It is another object of this invention to provide an electric servo circuit in which the output voltage or current faithfully follows the input voltage or current, irrespective of the values of the input impedance and output impedance.

It is another object of this invention to provide an improved summation circuit, in which the output voltage or current is directly proportional or equal to the algebraic sum of the input voltages or currents.

It is a further object of this invention to provide an analogue computer having a plurality of input terminals and an output terminal, and which is effective to deliver at its output terminal an output current or voltage which is proportional to the product of the several input currents or voltages, and in which a quotient instead of a product can be obtained for any given factor, merely by reversing the direction or polarity of the input current or voltage which it is desired should appear in the denominator.

In accordance with these and other objects which will become apparent in the following specification, preferred forms of the instant invention will now be described with reference to the accompanying drawings wherein.

Figure 1:
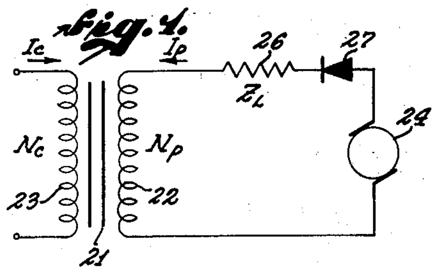
Fig. 1 is a wiring diagram of a simple form of magnetic amplifier.

Referring to Fig. 1, there is shown a simplified circuit of a rudimentary magnetic amplifier having a saturable core 21, an output or power winding 22, which has an effective number of turns designated by the symbol $N_p$ and an input or control winding 23 which has an effective number of turns designated by the symbol $N_c$. Current for the power winding 22 is supplied from any suitable source of alternating voltage 24, through an output load impedance 26 ($Z_L$), and through a rectifier 27, all connected in series with the power winding 22, as shown in Fig. 1. Thus, there is effectively applied across the terminals of the power winding 22, a pulsating unidirectional voltage from the source 24; and is caused to flow in the circuit of the winding 22, a pulsating unidirectional current, the average value of which will be designated herein by the symbol $I_p$. The instantaneous value of this current will be designated hereinafter by the symbol $i_p$.

Through the control winding 23 is applied a unidirectional control current $I_c$. While this control current $I_c$ may fluctuate with time, the frequency of such fluctuation is so much smaller than the frequency of the applied voltage 24 that for analytical purposes $I_c$ may be regarded as a direct current of constant or relatively slowly changing value.

Figure 2:
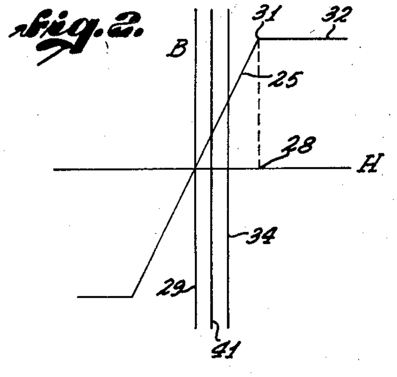

The core 21 of the magnetic amplifier shown in Fig. 1 has a saturation characteristic somewhat as shown in Fig. 2. While the characteristic shown in Fig. 2 is idealized, nonetheless it is representative of the essential nature of the core 21 which is taken advantage of in the magnetic amplifier—namely, a relatively steep slope 25 at the start of the curve, followed by a sharp knee 31 as saturation is approached, which quickly levels off to the saturation slope of the curve. While the saturation slope or portion 32 of the curve has been shown as perfectly horizontal, it is recognized that, in an actual core, there continues a slight upward slope of the curve. The characteristic of Fig. 2, however, will serve for analytical purposes to illustrate the principles of the present invention.

In the curve as shown in Fig. 2, the abscissa represents field strength H, and the ordinate represents flux B. As long as the field strength applied to the core 21 remains below the value shown at 28 in Fig. 2, the core is unsaturated and the winding 22 presents a relatively high impedance to the flow of current from the voltage source 24. During that portion of any given cycle when the field strength is above the value 28, the core is saturated, and the winding 22 presents a relatively low impedance to current flow. Thus the instantaneous impedance presented by the winding 22 jumps quickly from a high value to a low value, depending on whether the operating region of the core 21 is above or below the saturation point 31.

Figure 3:
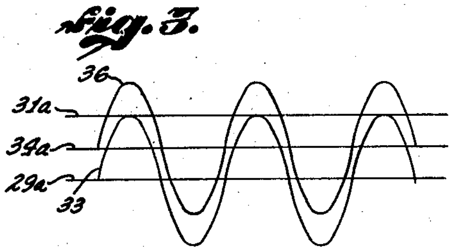
Figs. 2, 3 and 4 are graphs illustrating the operation the circuit of Fig. 1.

Let it be supposed that an alternating field strength H, as shown in Fig. 3, is to be applied to the core 21, having the characteristic shown in Fig. 2. If the core has no magnetic bias, the field strength H of Fig. 2 will operate about a symmetrical point represented by the vertical ordinate 29 in Fig. 2. This operating point corresponds to the operating line 29*a* shown in Fig. 3. Let it be supposed that the saturation knee 31 of the curve 32 is represented by the level 31*a* in Fig. 3. The field strength H which will be applied (in this first example) to the core 21 is represented by the alternating current 33 shown in Fig. 3. In this circumstance it will be seen that the core will always be operating in its high impedance range, and hence the current flow will be small.

Now let it be supposed that a magnetic bias is applied to the core 21 by the ampere turns of the control winding 23. This bias now causes the core to operate about the line 34 shown in Fig. 2, the corresponding line being shown at 34*a*, in Fig. 3. Now the alternating field strength H is represented by the curve 36 in Fig. 3, which for a substantial portion of each half cycle rises above the saturation knee 31*a* of the curve 32. Hence during that portion of the cycle the core is saturated, and the winding 22 presents a relatively low impedance to the flow of current therethrough.

Figure 4:
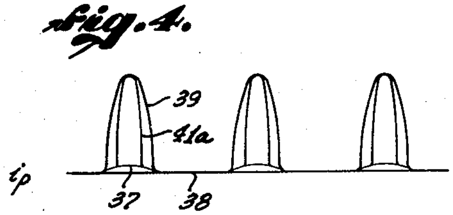

Proceeding now to Fig. 4 there is shown the instantaneous current $i_p$ which results from the field strength patterns 33 and 36 of Fig. 3. The alternating field H indicated by the current 33 produces only a small pulse of current 37, because during all of the cycle the core is unsaturated and presents a high impedance. In between pulses 37 there is no current at all, practically, as shown at 38, because of the presence of the rectifier 27 in Fig. 1. However, when the bias 34*a* is applied to the core 21, so that the field strength is now as represented by the curve 36, the resulting instantaneous current $i_p$ will be as shown at 39 in Fig. 4, because the moment the core becomes saturated, the impedance drops sharply, and a large current pulse is permitted to flow as shown at 39.

For an intermediate value of bias, represented by an intermediate value of ampere turns in the control winding 23, the bias will be as shown at 41 in Fig. 2. For such a bias the instantaneous current pulses will appear as shown for example at 41*a* in Fig. 4.

It will be seen by observation of Fig. 4, that the average current $I_p$ which flows through the output or power winding 22 of Fig. 1, varies directly with the magnetic bias provided by the control ampere turns of the winding 23. When the control current $I_c$ is zero, the average current will be only that produced by the small pulses 37. When $I_c$ is at an intermediate value such as produces the bias 41, then $I_p$ will be the average value of the pulses 41*a* in Fig. 4, and when $I_c$ is at a higher value as represented by the bias 34, then the average current $I_p$ will be the average value of the current pulses 39 of Fig. 4.

Figure 5:
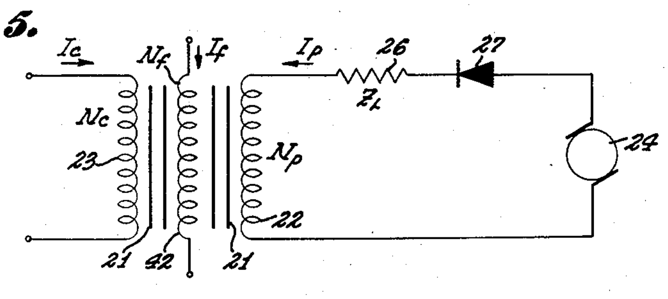
Fig. 5 is a wiring diagram of a somewhat refined type of magnetic amplifier.
Figure 6:
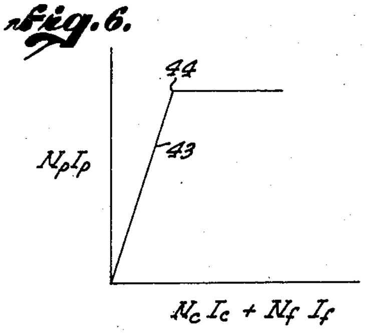
Fig. 6 is a graph illustrating the operation of the circuit of Fig. 5.

Referring now to Fig. 5, a circuit is shown with another control winding in the form of what will be termed a feedback winding 42. The winding 42 has an effective number of turns denominated by the symbol $N_f$ and a current $I_f$ flows through the winding 42. As has been explained in conjunction with Figs. 1–4, the average current $I_p$ in the power winding 22 varies directly with the magnitude of the control current $I_c$ in the control winding 23. In an idealized situation (as shown in Fig. 6) such a relation is a linear one, in which $I_p$ has a straight line relation with respect to $I_c$, up to the point where $I_c$ is so large that it itself completely saturates the core 21, at which point the linear relationship ceases. Within the operating range of the core, that is, before the saturation point by $I_c$ is attained, this relation is represented by the following equation:

(1) $$I_p=K_1I_c$$

While the above discussion has concerned the relationship between $I_p$ and $I_c$, a more convenient relationship is expressed in terms of the ampere turns $N_pI_p$ in the power winding, as compared with the ampere turns $N_cI_c$ which produce the effective biasing field H in the core 21. This relationship is shown in the following equation:

(2) $$N_pI_p=KN_cI_c$$

In the above equation K is a constant which will be defined as the inherent amplifier gain.

In the case of the circuit shown in Fig. 5, the effective control flux is actually the sum of the fluxes produced by the two windings 23 and 42. In this case the ampere turns $N_pI_p$ of the power winding are proportional to the total ampere turns $N_cI_c$ plus $N_fI_f$, as shown in Fig. 6. In this figure, the portion 43 of the curve has a slope equal to K, and represents the operating portion of the amplifier. The sharp knee 44 in Fig. 6 represents the operating point at which the control flux injected by the windings 23 and 42 substantially saturates the core 21 so as to destroy the linear relation. Again it will be understood that the curve of Fig. 6 is an idealized curve and is used only for the general explanatory and analytical purposes of the present invention.

The operating portion 43 of the curve shown in Fig. 6 is represented mathematically by the following equation:

(3) $$N_pI_p=K(N_cI_c+N_fI_f)$$

Figure 7:
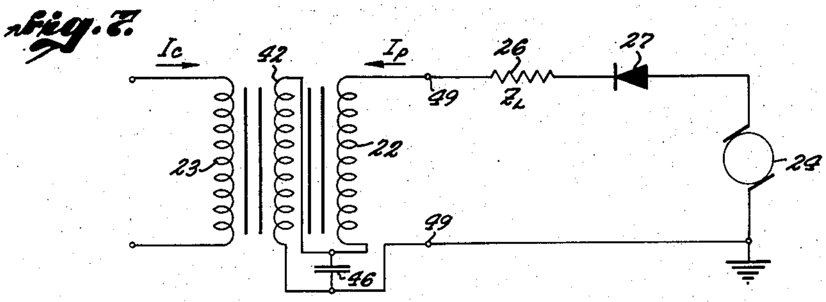
Fig. 7 is a wiring diagram of a further refined type of magnetic amplifier embodying features of the present invention.

In Fig. 7 the circuit of Fig. 5 is shown with the feedback winding 42 connected in series with the power winding 22 so that $I_f$ now becomes $I_p$. Since the current in the power winding 22 is a pulsating unidirectional current, and since it is desirable that the control currents which flow through the windings 42 and 23 be non-pulsating, means are provided for eliminating, from winding 42, the pulsating or alternating component of the current $i_p$ in the winding 22, such a means being shown in the form of a bypass capacitor 46 shunting the winding 42. Thus only the direct current component of the current in winding 22, which is the average value $I_p$, flows through the winding 42, while the pulsating or A.C. component is bypassed through the capacitor 46.

The relationship between the currents in the circuit of Fig. 7 now becomes as follows:

(4) $$N_pI_p=K(N_cI_c+N_fI_p)$$

Solving Equation 4 to obtain the relationship between $I_p$, the power current, and $I_c$, the control current in winding 23, gives the following:

(5) $$I_p=\left(\frac{KN_c}{N_p-KN_f}\right)I_c$$

Now let the effective number of turns in the feed-back winding $N_f$ of Fig. 5 be selected so that it is equal to $N_p$ divided by K, as shown in the following equation:

(6) $$N_f\equiv N_p/K$$

Inserting the relationship of Equation 6 into Equation 5, gives the following:

(7) $$I_p=I_c(KN_c/O)$$

Equation 7 illustrates that the sensitivity of $I_p$ with respect to $I_c$ is now extremely great; that is to say, when $I_c$ has a very, very small positive value, $I_p$ immediately assumes its maximum value within the operating range of the amplifier. This is the value which is attained when the core 21 is driven completely to saturation. Similarly, when $I_c$ has a very, very small negative value, it is sufficient, by virtue of the relationship expressed in Equation 7, to cut $I_p$ down to its minimum value, this value being the minimum value illustrated by the intermittent pulses 37 of Fig. 4.

Figure 8:
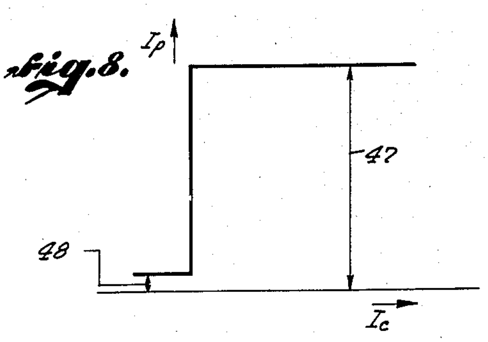
Fig. 8 is a graph illustrating the operation of the circuit of Fig. 7.

This relationship between $I_p$ and $I_c$, expressed roughly in Equation 7, is shown graphically in Fig. 8. In this figure the value of $I_p$ shown at 47 is the maximum value which $I_p$ attains and is represented by full saturation of the core. The value of $I_p$ represented by the numeral 48 is the minimum value of $I_p$, corresponding to the current pulses 37 mentioned hereinbefore.

From the above it will be seen that the circuit shown in Fig. 7 is one which has two discrete modes of operation, and which is extremely sensitive to the polarity of the current $I_c$ in the control winding 23. A very small positive current $I_c$ through the winding 23 causes a minimum impedance to appear across the input terminals 49 of the circuit, while a very small negative current $I_c$ causes a maximum impedance to be presented at the input terminals 49. This is the relationship graphed in Fig.

8. The circuit in Fig. 7 thus has the attributes of a very sensitive switch or relay which moves abruptly between two discrete modes of operation represented by high or maximum current 47 and low or minimum current 48, in dependence upon an infinitesimally small current $I_c$ of either positive or negative polarity.

Figure 9:
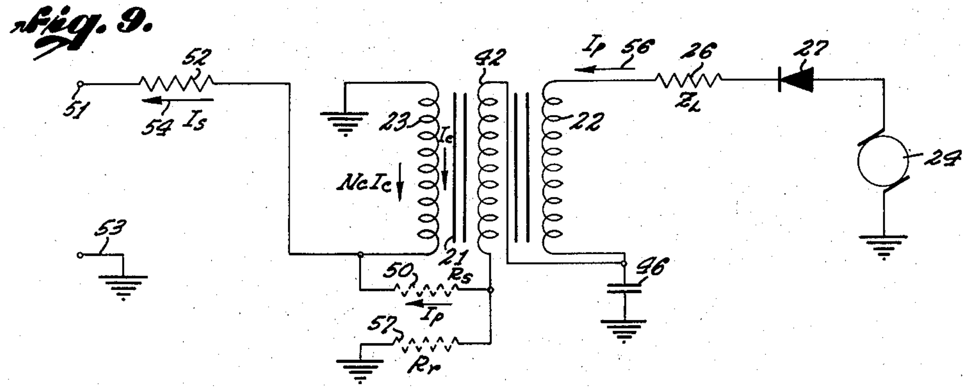
Fig. 9 is a wiring diagram of a further refinement of a magnetic amplifier embodying features of the present invention.

Fig. 9 represents a further refinement of the circuit of Fig. 7, in which the bottom terminal of the feed back winding 42, instead of being returned directly to the output terminal, which is grounded, is connected to the ungrounded terminal of the control winding 23, through the circuit connection 50. The ungrounded terminal of the control winding 23 is also connected to the input terminal 51 through an isolating impedance 52. The other input terminal is grounded, as shown at 53. The input current will now be denominated $I_s$, representing a signal current.

Let it now be assumed that a source of electric power is applied across the terminals 51 and 53 such as to cause a signal current $I_s$ to flow as shown by the arrow 54. The apparatus must immediately respond in accordance with Equation 7 so that the effective impedance facing the A.C. source 24 will be such as to cause $I_p$ to equal $I_s$. This must be so in order to keep $I_c$ equal to zero.

Let it be supposed that $I_p$ as represented by the arrow 56 is somewhat greater than $I_s$. The difference will be represented by a small negative value of $I_c$, since it has been assumed that a positive $I_c$ represents a downward flowing current in the winding 23. According to the relation established by Equation 7, this small negative value of $I_c$ immediately tends to drive $I_p$ down to its minimum value. However, as soon as $I_p$ has dropped slightly to come into equality with $I_s$, $I_c$ has disappeared or dropped to zero, and hence the control current $I_c$ of Equation 7 will have disappeared. A similar phenomenon occurs if $I_p$ should tend to drop below $I_s$. In this event the difference must be supplied by a positive value of $I_c$. This immediately tends to cause $I_p$ to increase in accordance with Equation 7. Thus it is seen that the circuit of Fig. 9 constitutes an extremely stable servo circuit in which $I_p$ is forced to faithfully follow $I_s$ by virtue of its high sensitivity to $I_c$, as seen by Equation 7.

It will be appreciated that this is not a matter of impedance matching. The only impedance which $I_s$ sees between the terminals 51 and 53 is that of the isolating impedance 52. Similarly, the output impedance $Z_L$ illustrated at 26, may be made as large as required within the capabilities of the supply source 24, and the source 24 must still supply the necessary $I_p$ through the impedance 26 in order to exactly balance off or equalize $I_s$. This of course also assumes that operation is at all times within the operating range of the core 21, as described hereinbefore, particularly in connection with Fig. 6.

The circuit of Fig. 9 may be refined to cause $I_p$ to always bear a certain ratio to $I_s$. This may be done by making the circuit connection 50 in the form of an impedance or resistor $R_s$ and inserting an impedance or resistor 57, having a value $R_r$, between ground and the bottom terminal of the feed-back winding 42. In this event the relation between $I_p$ and $I_s$ is shown by the following equation.

$$I_p = I_s\left(\frac{R_s+R_r}{R_r}\right) \tag{8}$$

Figure 10:
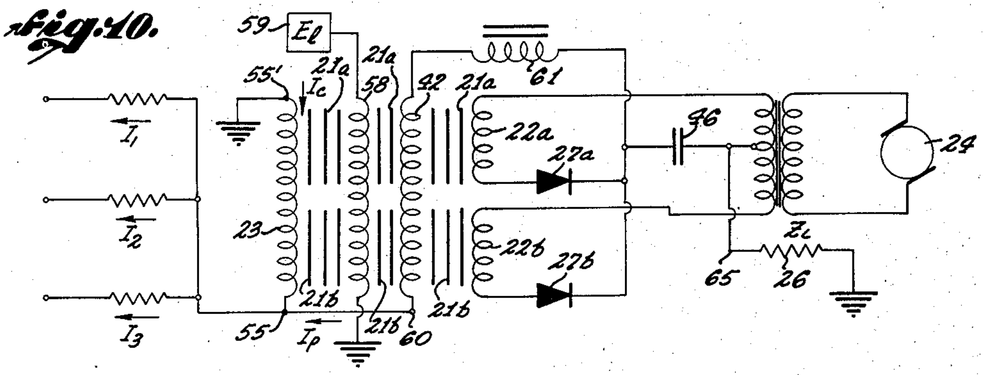
Fig. 10 is a wiring diagram of a still further refined form of magnetic amplifier embodying features of the present invention.

The circuit of Fig. 9 may be conveniently and easily refined into the summation circuit shown in Fig. 10, simply by employing a plurality of input currents $I_1$, $I_2$, and $I_3$, instead of the single input current $I_s$ of Fig. 9. In the circuit of Fig. 10 the same relationships described for Fig. 9 hold, with the substitution of the algebraic sum of $I_1$, $I_2$, and $I_3$, for $I_s$ of Fig. 9. The circuit of Fig. 10 also includes a biasing winding 58 which has been alluded to hereinbefore, but never specifically mentioned. This winding is needed to apply a preliminary magnetic bias to the core in order to cause the abrupt rise in $I_p$ illustrated in Fig. 8 to occur when $I_c$ equals zero. The curve shown in Fig. 8 is shifted bodily horizontally in dependence upon the particular value of the magnetic bias applied through the winding 58 from the D.C. source 59.

The circuit of Fig. 10 also includes a refinement in the primary or power winding, in that the winding is divided into two parts, 22a and 22b, in order to take advantage of both half cycles of the alternating power source 24. This arrangement is conventional in the art where full wave rectification is desired, and further description is not believed to be necessary. The only new element added here is a choke coil 61 in series with the feed-back winding 42, which serves to further block pulsations through the feed-back winding 42 and the control winding 23.

In the above stated relation, $I_p=I_1+I_2+I_3$ (Fig. 10), any of the terms may be made negative simply by reversing the direction of the current indicated by the arrows in Fig. 10 so long as the aggregate input current does not reverse in sign. If the aggregate input current does reverse in sign the connections must be changed to exchange input terminals 55 and 55' and output terminals 60 and 65.

Figure 11:
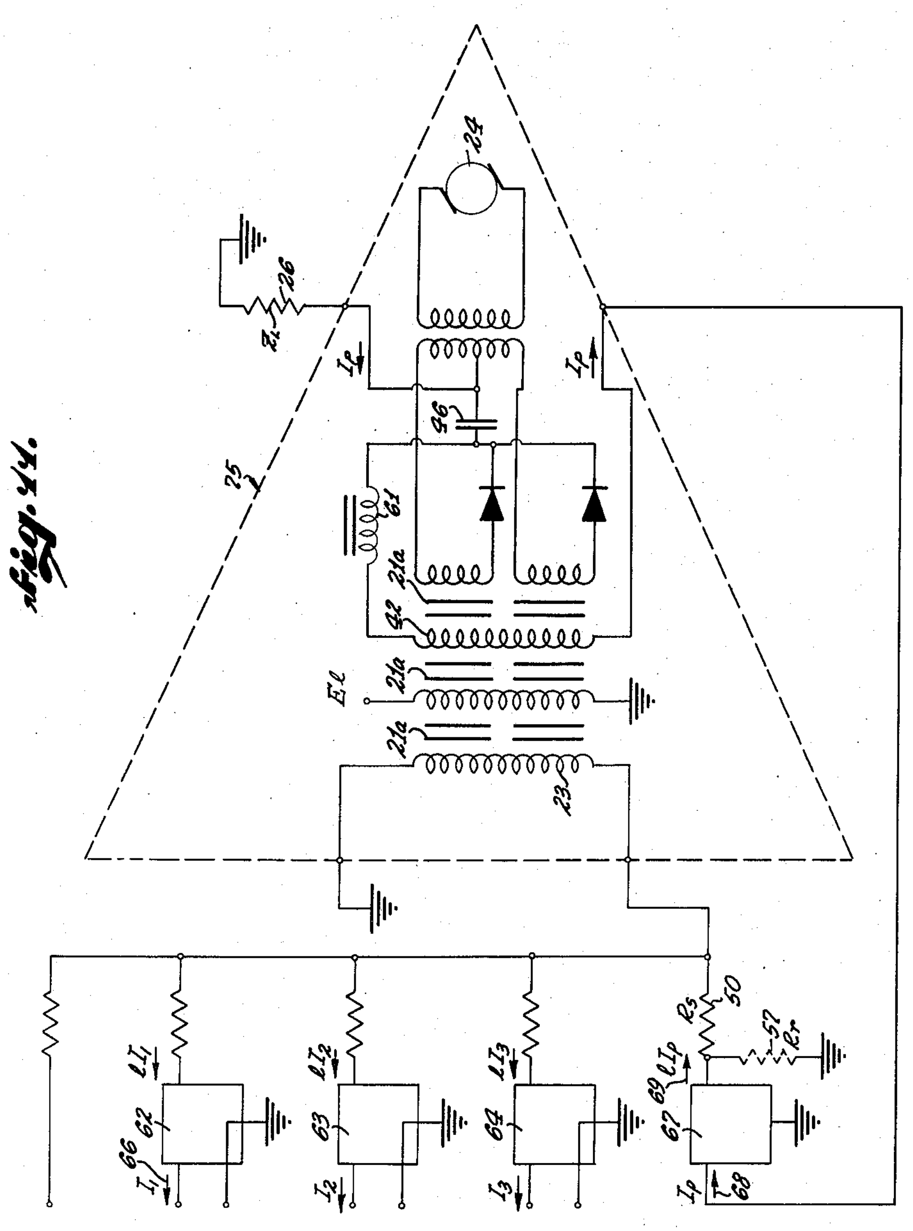
Fig. 11 is a wiring diagram of an analog computer or multiplying circuit embodying features of the present invention.

By a further refinement, the summation circuit of Fig. 10 may be made into an analogue computer, as shown in Fig. 11. In this figure the power or output current $I_p$ is at all times equal to the product of the input currents $I_1$, $I_2$, and $I_3$, or if desired, any one of the factors may be placed in the denominator simply by reversing the direction of the corresponding input current. Such multiplication and/or division is achieved by the use of a number of logarithmic circuits 62, 63, and 64 inserted after the input terminals, which are so designed as to cause the output current appearing at the right hand side of the logarithmic circuit to be equal to the logarithm of the input current applied at the left-hand side. Thus, for example, where $I_1$, shown by the arrow 66 in Fig. 11, is applied to the input of the circuit 62, its logarithm, $\log I_1$, appears at the output terminal and is applied to the apparatus of the present invention.

Similarly, a logarithmic circuit 67 is inserted in the $I_p$ circuit, between the feed-back winding 42 and the control winding 23. Thus where $I_p$ is applied to the input of the circuit 67 as shown by arrow 68, there flows out of the circuit 67 the log of $I_p(\log I_p)$ as shown by the arrow 69.

Logarithmic circuits of the type represented schematically at 62, 63, 64 and 67 may be of many types, one such being disclosed in U.S. Patent 2,244,369, Martin, and another in my co-pending application S.N. 557,977, filed January 9, 1956, now abandoned.

It will readily be seen by reference to Fig. 11, that the circuit is such as to cause the following relation to exist:

$$\log I_p = \log I_1 + \log I_2 + \log I_3 \tag{9}$$

Equation 9 may be solved for $I_p$ giving the following result:

$$I_p = I_1 I_2 I_3 \tag{10}$$

If it is desired, for example to solve the following equation:

$$I_p = I_1 I_2 / I_3 \tag{11}$$

then it is only necessary to reverse the direction of $I_3$ shown in Fig. 11, since a negative logarithm corresponds to the term itself in the denominator.

Exponents may be introduced into Equation 10 by the use of auxiliary resistors 50 and 57 having the values $R_s$ and $R_r$ respectively, as described in conjunction with Fig. 9. In this case the relationship becomes:

$$I_p = (I_1 I_2 I_3)^{\frac{R_s+R_r}{R_r}} \tag{12}$$

In the above equation, $R_r$ is the resistance of 57, while $R_s$ represents the resistance of 50.

It will be noted in Fig. 11, that the currents $I_1$, $I_2$ and $I_3$ are to the left, that is, flowing out of the respective logarithmic circuits 62, 63, and 64. These will be conventionally called negative currents. It will be further noted that the current $I_p$, represented by the arrow 68, flows into the logarithmic circuit 67. This conventionally represents a positive input current. In some cases the logarithmic circuits 62, 63, 64, and 67 require positive or negative biases, depending upon whether positive or negative input currents are to be applied to their input terminals. It will be seen, therefore, that Fig. 11 may have a slight disadvantage of requiring both positive and negative logarithmic circuits, the former being represented by the circuit 67, and the latter being represented by the circuits 62, 63, and 64. Thus such an arrangement would require both positive and negative voltage biases which, under certain conditions might constitute a disadvantage.

Figure 12:
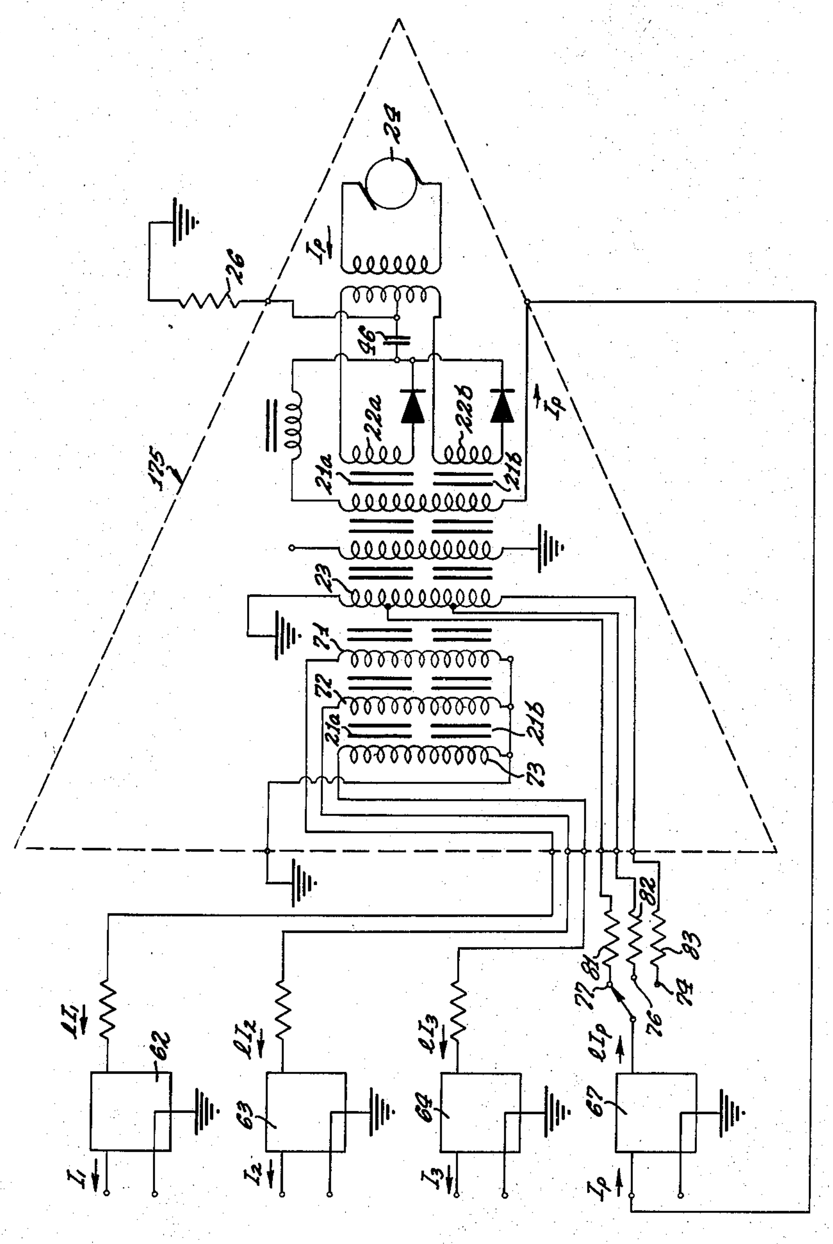
Fig. 12 is an alternative form of multiplying circuit generally equivalent to that shown in Fig. 11.

This disadvantage is overcome by replacing the amplifier 75 of Fig. 11, with the amplifier 175 shown in Fig. 12, wherein addition of the logarithmic currents is not done electrically, by physically connecting the conductors together, but is done magnetically.

In the circuit of Fig. 12, the effect of the respective currents $I_1$, $I_2$, and $I_3$ is applied to the apparatus magnetically by providing each of the currents with its own winding. Thus the magnetic effect of current from the circuit 62, log $I_1$, is applied to the cores 21$a$ and 21$b$ by winding 71; log $I_2$ is applied through a winding 72 and log $I_3$ is applied through a winding 73. It was shown in connection with Fig. 11 that the relationship of Equation 9 must be maintained or else there would be a current in winding 23 which would cause the apparatus to return to the condition represented by Equation 9. The same condition must hold for Fig. 12; that is the sum of the fluxes produced in the windings 71, 72 and 73 must be completely offset or neutralized by the flux produced by lop $I_p$. In this case log $I_p$ is applied through the control winding 23 itself. As long as the algebraic total of flux generated by the aggregate of windings 73, 72, 71, and 23 is equal to zero, then the balanced or steady state condition prevails. If, now, one of the currents, for example log $I_1$ should decrease, there would be a net flux resulting from the totality of windings 23, 71, 72, and 73, which is not equal to zero. This unbalance would immediately be reflected into the power windings 22$a$ and 22$b$ and would cause such a change in impedance as would lower log $I_p$ to recreate the relation established in Equation 9.

The circuit of Fig. 12 has the advantage of requiring only one type of logarithmic circuit, as exemplified by the circuit 62. This is true because all of the circuits may be made positive current circuits, and whenever a negative input is desired to the amplifier or computing apparatus, it is only necessary to reverse the connection to the appropriate winding 71, 72, or 73 as the case may be.

Any desired exponent, greater or less than one, may be applied to $I_p$ in Equation 10. This may be done by tapping into the winding 23 at suitable points, as shown by the respective switch contacts 74, 76, and 77. For example, by applying log $I_p$ to the full winding 23, through the terminal 74, an exponent greater than 1 may be applied to $I_p$ in Equation 10. Thus if such an exponent is equal to 2, the output current may be made equal to the square root of the product of the several input currents. Where the term product is used herein, it will be understood that a quotient is equally applicable, and may be obtained simply by reversing the direction of the input current corresponding to the desired term which is to be placed in the denominator of the factor. By applying the log $I_p$ to a lesser portion of the winding 23, as through the terminal 76, the exponent applied to $I_p$ in Equation 10 may be made equal to 1. Similarly, by applying log $I_p$ to only a small portion of the winding 23, an exponent less than 1 may be applied to $I_p$ in Equation 10. Thus, for example, if this exponent is chosen to be ½, then $I_p$ may be made equal to $(I_1I_2I_3)^2$. Since the logarithmic network or circuit 67 should always look into the proper impedance, resistors 81, 82, and 83 are inserted in series with the contacts 77, 76, and 74, respectively, in order to make the resistance between the output of circuit 67 and ground equal to the proper load value.

It will be seen that both the electric summation of Fig. 11 and the magnetic summation of Fig. 12 involve, in effect, a cancellation of the effect of the magnetic flux produced by the control winding 23. In the circuit of Fig. 11 this cancellation is effected by making the currents $\log I_1 + \log I_2 + \log I_3$ equal to $\log I_p$ so that the net current through winding 23 is zero; hence the winding flux, and its effect are cancelled. In Fig. 12, the current log $I_p$ flows through winding 23, but the flux generated thereby is neutralized by the equal and opposite flux from windings 71, 72, and 73.

Stated differently, the winding 23 constitutes an error sensing means through which any deviation or departure from the relation $\log I_p = \log I_1 + \log I_2 + \log I_3$ is sensed and reflected into the core of the amplifier so as to reestablish the relation. In Fig. 11 such deviation or error is sensed by the appearance of any slightest current in winding 23. In Fig. 11 such deviation is sensed by any current which departs from such a value of log $I_p$ as to alter the desired relation of $\log I_p = \log I_1 + \log I_2 + \log I_3$. In either case, the sensing means is effective to always keep the net flux from all of the windings to the left of the winding 58 equal to zero.

It is to be understood that the apparatus of Figs. 10–12 preferably employs two cores 21$a$ and 21$b$.

Figure 13:
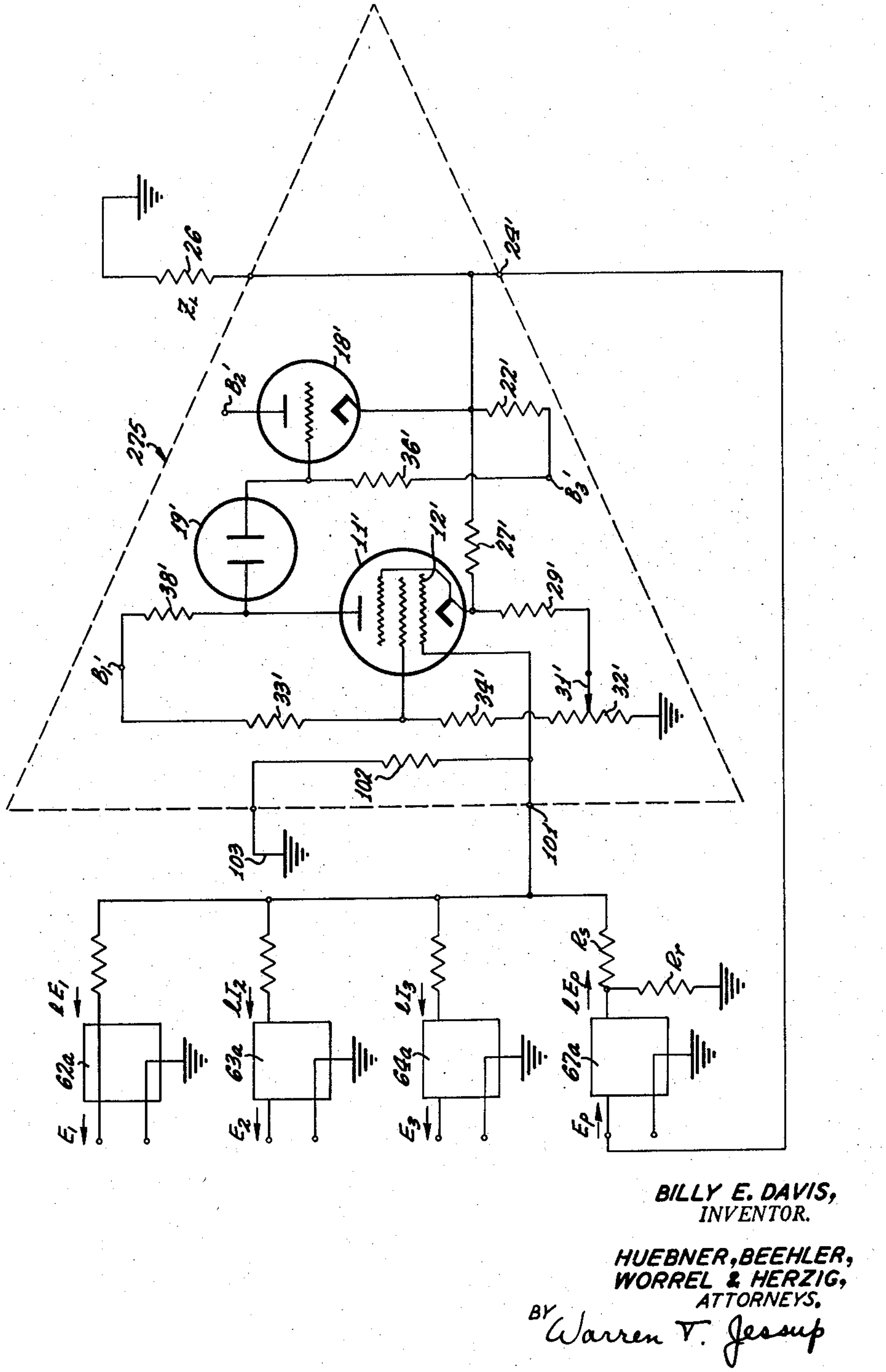
Fig. 13 is a wiring diagram of a multiplying circuit employing a tube amplifier instead of a magnetic amplifier and constructed in accordance with principles of the present invention.

The computer feature of the present invention may be equally well practiced with a tube amplifier as with a magnetic amplifier as described hereinbefore in connection with Figs. 11 and 12. In Fig. 13 a computer is shown wherein a tube amplifier 275 replaces the magnetic amplifier 75 of Fig. 11. Since tube circuits are generally better adapted for handling voltage inputs and outputs rather than current inputs and outputs, as is the case with magnetic amplifiers, the electric quantities employed in Fig. 13 are essentially voltages rather than currents.

The circuit shown in Fig. 13 within the schematic outline 275 representing the amplifier may be any form of very high gain amplifier. For purposes of illustration, there has been shown an amplifier employing the principles of the circuit disclosed in Patent 2,581,456, Swift, to which reference is hereby made for details of operation. In the circuit of Fig. 13, the parts bear the same numbers as the corresponding parts in Fig. 1 of Patent 2,581,456, except that in Fig. 13 the numerals have been primed ('). Thus in Fig. 13, the input, or aggregate signal voltage, is applied at the terminal 101 to the grid 12' of the tube 11'. The output is taken from the output terminal 24', this corresponding to the output terminal 24 of the amplifier shown in the Swift patent. This output is essentially a voltage $E_p$ which is fed back through the logarithmic circuit 67$a$ and emerges as a logarithm of the voltage, namely, log $E_p$. In Fig. 13 the circuit 67$a$ takes the place of the impedance 26 in the Swift patent. This voltage log $E_p$ is combined with the several output voltages log $E_1$, log $E_2$ and log $E_3$, and the resultant is applied to the input terminal 101.

In the circuit of Fig. 13, the logarithmic circuits or networks 62$a$, 63$a$, 64$a$ and 67$a$ are designed to accept voltages rather than currents, as was the case with the circuits of Figs. 11 and 12. Thus, for example, the circuit 62$a$ may be any satisfactory network which will accept a voltage $E_1$ at its input terminal and deliver to its output terminal an output voltage log $E_1$, which is the logarithm of the input $E_1$.

It is desirable, although not essential, that the input voltages feed into the proper input impedance; therefore a resistor 102 is connected between the input terminal 101 and the ground terminal 103.

It will be understood that the principles of the present invention are equally applicable where the quantities to be computed are in terms of current, voltage, electrostatic field, or any other electric quantity which may be readily derived as a term to be operated upon mathematically.

While the instant invention has been shown and described herein in what is conceived to be the most practical and preferred embodiment, it is recognized that departures may be made therefrom within the scope of the invention which is therefore not to be limited to the details disclosed herein but is to be accorded the full scope of the claims.

What is claimed is:

1. Servo circuit having input and output terminals, and effective to cause the current flowing through its output terminal to faithfully match that through its input terminal, comprising; a magnetic amplifier having a power winding, a feedback winding, and a control winding, circuit means connecting one terminal of said feedback winding to one terminal of said power winding, the other terminal of said power winding being connected to said output terminal, the other terminal of said feedback winding being connected to said input terminal and also to said control winding.

2. Apparatus according to claim 1, wherein:

$$N_f = N_p/K$$

where:

$N_f$ is the effective number of turns in the feedback winding;
$N_p$ is the effective number of turns in the power winding; and
K is the inherent gain of the amplifier, defined as:

$$K = \frac{N_p I_p}{N_c I_c + N_f I_f}$$

where:

$N_p I_p$ is the ampere turns of the power winding;
$N_c I_c$ is the ampere turns of the control winding;
$N_f I_f$ is the ampere turns of the feedback winding.

3. Summation circuit having a plurality of input terminals and an output terminal, and effective to cause the current flowing through said output terminal to equal the algebraic sum of the currents flowing through said input terminals, comprising: a magnetic amplifier having a power winding, a feedback winding, a control winding, circuit means connecting one terminal of said feedback winding to one terminal of said power winding, circuit means connecting the other terminal of said power winding to said output terminal, and circuit means connecting the other terminal of said feedback winding to said input terminals, and also to said control winding.

4. Apparatus according to claim 3 wherein:

$$N_f = N_p/K$$

where:

$N_f$ is the effective number of turns in the feedback winding;
$N_p$ is the effective number of turns in the power winding; and
K is the inherent gain of the amplifier, defined as:

$$K = \frac{N_p I_p}{N_c I_c + N_f I_f}$$

where:

$N_p I_p$ is the ampere turns of the power winding;
$N_c I_c$ is the ampere turns of the control winding;
$N_f I_f$ is the ampere turns of the feedback winding.

5. Analogue computer having a plurality of input terminals and an output terminal, and effective to deliver at its output terminal an electric quanity equal to the product of the quantities applied to said input terminals and comprising: a first logarithmic circuit and a plurality of second logarithmic circuits having input and output terminals, each logarithmic circuit being effective to deliver to its output terminal an electric quantity proportional to the logarithm of the electric quantity applied to its input terminal; a magnetic amplifier having power winding, feedback winding, and control winding; circuit means connecting one terminal of said power winding to the computer output terminal; circuit means connecting the other terminal of said power winding to one terminal of said feedback winding; circuit means connecting the other terminal of said feedback winding to the input terminal of said first logarithmic circuit; circuit means connecting the output terminals of said second logarithmic circuits to the output terminal of said first logarithmic circuit and to said control winding; the input terminals of said second logarithmic circuits constituting the input terminals of the computer.

6. Computer according to claim 5 wherein:

$$N_f = N_p/K$$

where:

$N_f$ is the effective number of turns in the feedback winding;
$N_p$ is the effective number of turns in the power winding; and
K is the inherent gain of the amplifier, defined as:

$$K = \frac{N_p I_p}{N_c I_c + N_f I_f}$$

where:

$N_p I_p$ is the ampere turns of the power winding;
$N_c I_c$ is the ampere turns of the control winding;
$N_f I_f$ is the ampere turns of the feedback winding.

7. Summation circuit having a plurality of input terminals and an output terminal and effective to cause the current flowing through said output terminal to equal the algebraic sum of the currents flowing through said input terminals, comprising: a magnetic amplifier having power winding means, feedback winding means, control winding means, and circuit means connecting one terminal of said feedback winding means to one terminal of said power winding means and also to at least a portion of said control winding means, and connecting said power winding means to said output terminal and said control winding means to said input terminals.

8. Summation circuit comprising a plurality of input terminals; an output terminal; a magnetic amplifier having power winding means, a feedback winding means and control winding means; circuit means connecting said power winding means and said feedback winding means, means in series with the feedback winding means coupling said feedback winding means with said control winding means for cancelling the magnetic flux produced by the control winding, said cancelling means being responsive to the algebraic sum of the currents applied to said input terminals, whereby the current flowing through said output terminal is caused to be proportional to the algebraic sum of the currents applied to said input terminals.

9. Magnetic amplifier comprising a saturable magnetic core, power winding means and feedback winding means for applying a magnetic flux to said core, circuit means for applying to said power winding means a pulsating current having an appreciable D.C. component, means for applying to said feedback winding means a current which is a predetermined function of the D.C. component of said power winding current, control winding means in flux producing relation to said core, input means for supplying an input current to at least a portion of said control winding means, and means for supplying a cancellation current to at least a portion of said control winding means to substantially completely cancel the effect of said input current and to maintain substantially nil the net flux applied to said core by said control winding means, said cancellation current being a predetermined function of the current in said feedback winding means.

10. Servo circuit comprising a magnetic amplifier having a power circuit including a power winding and rectifier and a source of alternating current and a by-pass capacitor and a load connected in series, and having a control circuit including a control winding and isolating resistance and a source of signals connected in series, and a cancellation circuit means for by-passing the direct current component of the current flowing in said power winding around said by-pass condenser and at least in part through said control winding to said source of alternating current, said cancellation circuit means including a positive feedback winding on said magnetic amplifier connected at one end to said power winding to receive the direct curernt flowing therein and connected at its other end to a current dividing resistance circuit means to transmit a portion of said current to said control winding and return the remaining portion to said source of alternating current by-passing said winding.

References Cited in the file of this patent

UNITED STATES PATENTS

| | | |
|---|---|---|
| 2,244,369 | Martin | June 3, 1941 |
| 2,401,779 | Swartzel | June 11, 1946 |
| 2,518,865 | Cartotto | Aug. 10, 1950 |
| 2,569,135 | Trischka | Sept. 25, 1951 |
| 2,574,438 | Rossi | Nov. 6, 1951 |
| 2,644,129 | Ramey | June 30, 1953 |
| 2,810,519 | Creusere | Oct. 22, 1957 |

OTHER REFERENCES

Sack et al.: "Special Magnetic Amplifiers and Their Use in Computing Circuits," Proceedings of the IRE, November 1947, pages 1375–1382.

Transactions of the AIEE (Geyer), 1951, pages 1707–1712.

Some Electronic Analogue Computer Techniques (Robb et al.), January 1953, pages 13–16.